Nov. 30, 1948.　　　　S. G. THOMSON　　　　2,455,027
LITTER STRETCHER-BAR ASSEMBLY
Original Filed Aug. 24, 1942　　　　4 Sheets-Sheet 1
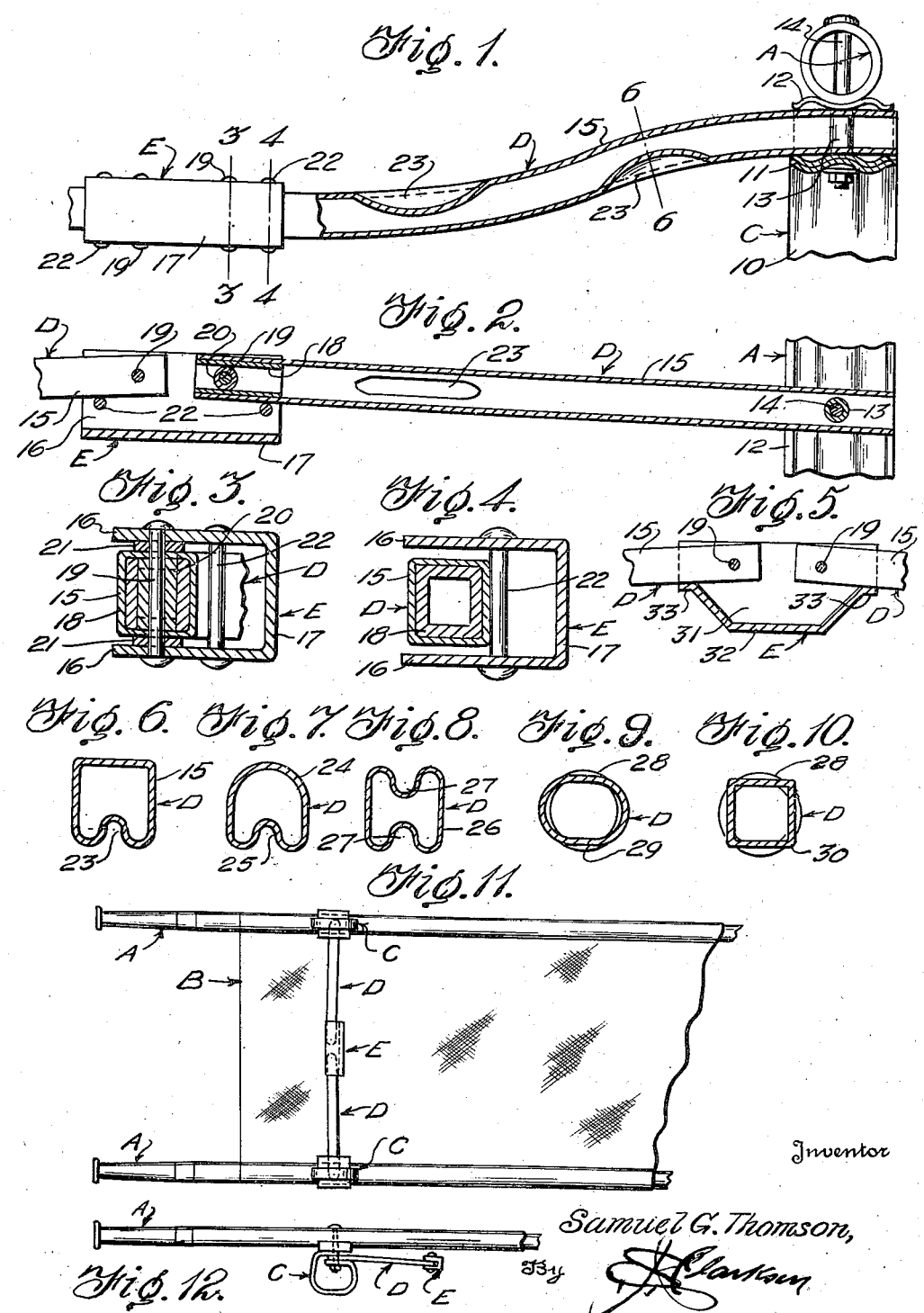

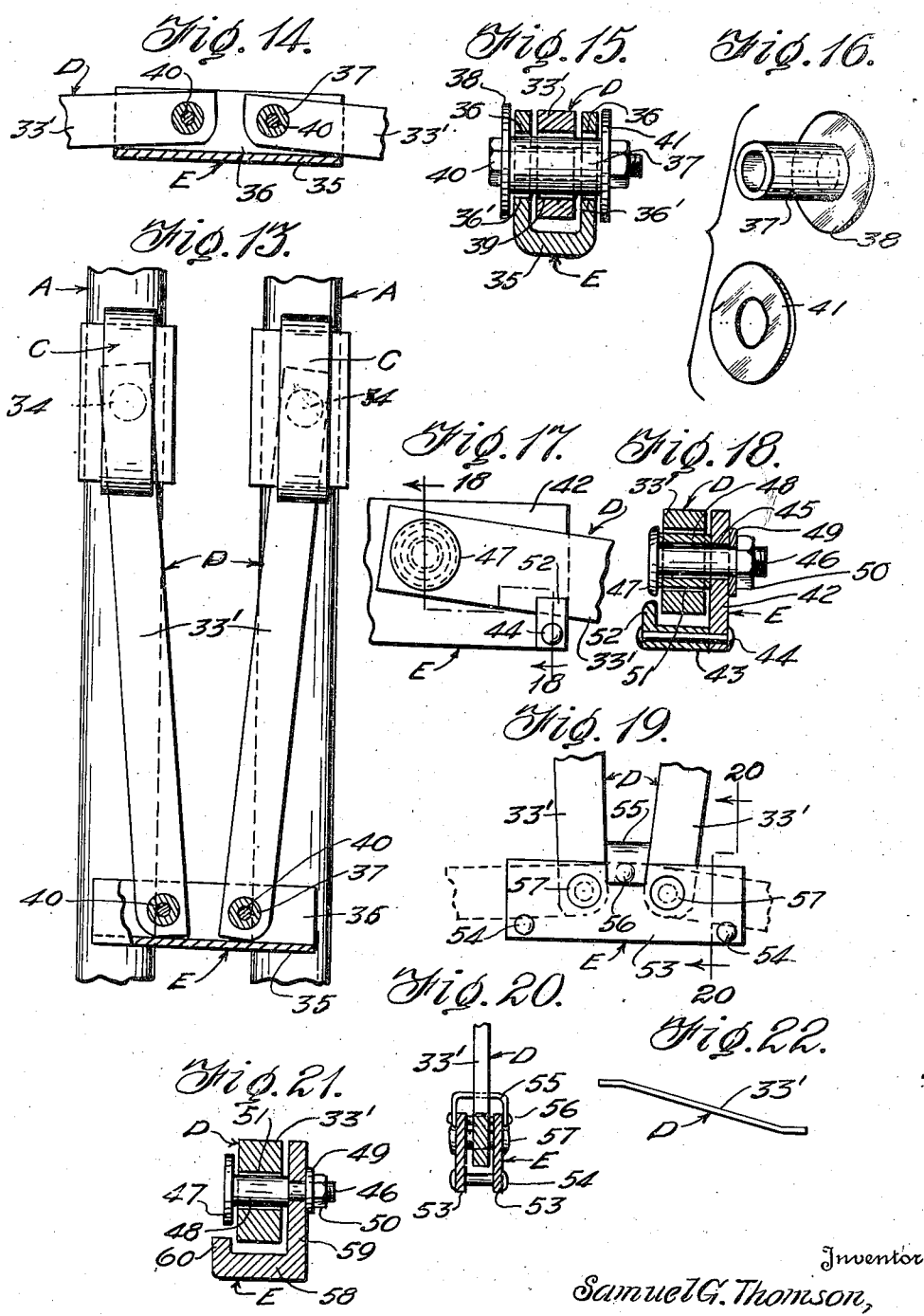

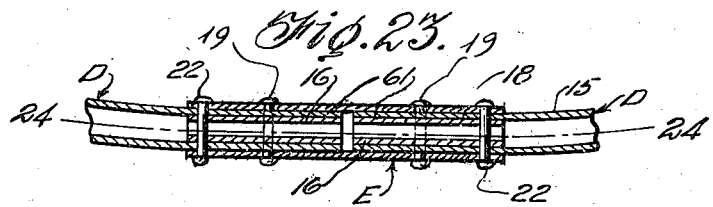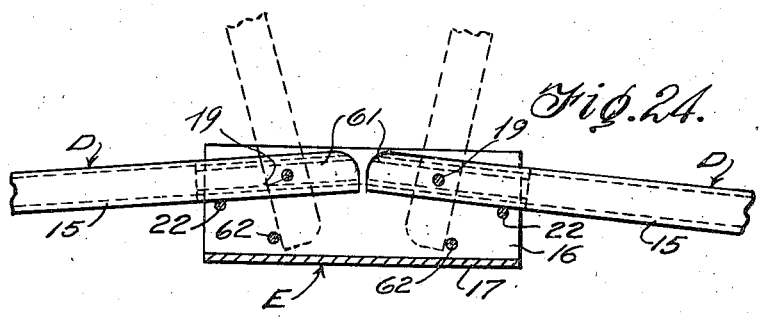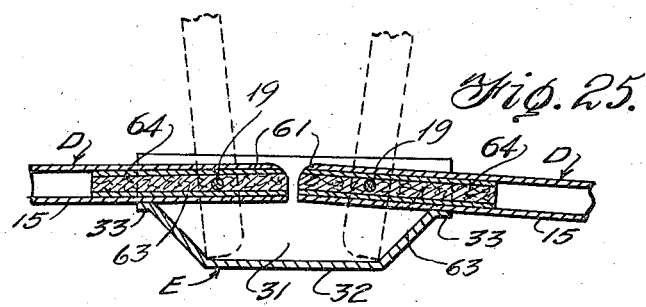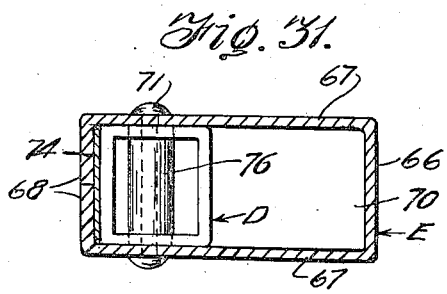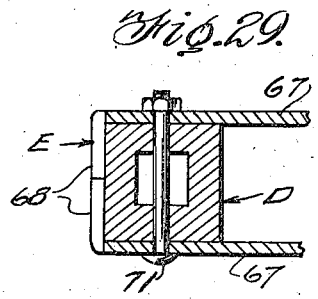

Nov. 30, 1948.  S. G. THOMSON  2,455,027
LITTER STRETCHER-BAR ASSEMBLY
Original Filed Aug. 24, 1942  4 Sheets-Sheet 4
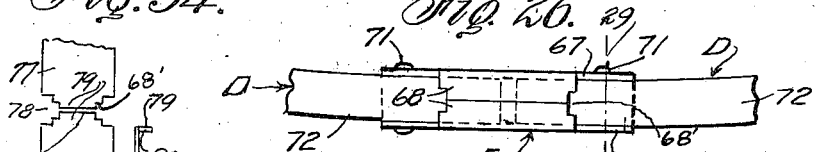
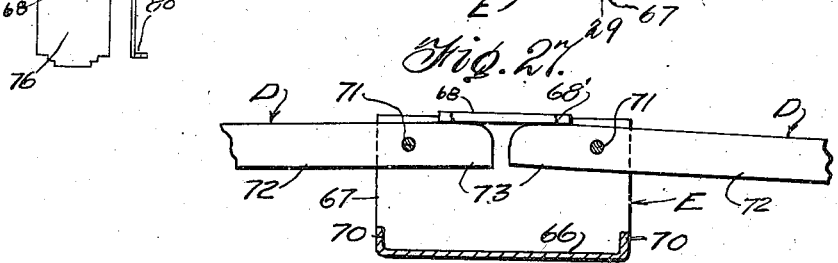
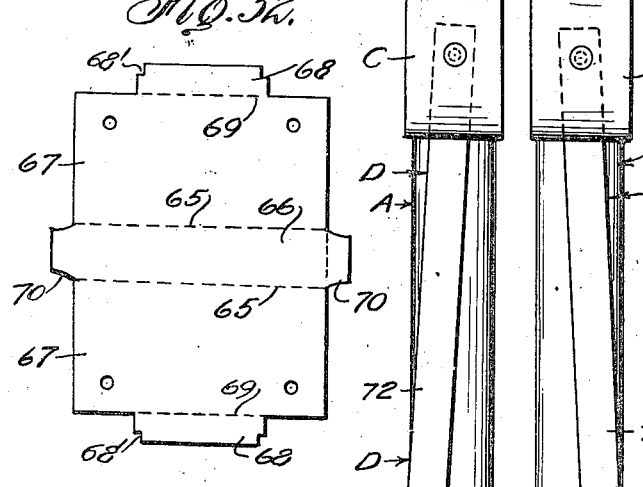
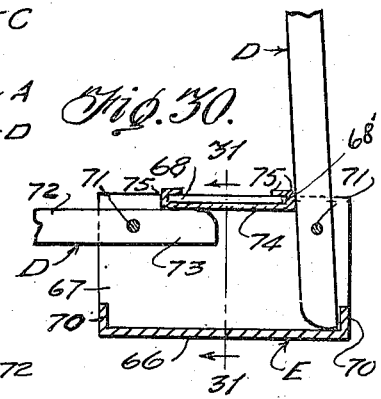
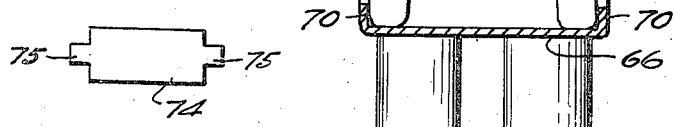
Inventor
Samuel G. Thomson,
By Clarkson
Attorney Patented Nov. 30, 1948

2,455,027

UNITED STATES PATENT OFFICE 2,455,027

LITTER STRETCHER-BAR ASSEMBLY

Samuel G. Thomson, Flushing, N. Y.

Substituted for application Serial No. 455,906, August 24, 1942. This application October 9, 1946, Serial No. 702,294

3 Claims. (Cl. 5—82)

This application is a substitute for Serial No. 455,906 which became abandoned on September 21, 1946.

This invention relates to litters such as are used to transport persons who may be incapacitated by illness or injury.

More particularly the invention relates to litters which may be folded for storage or transportation.

In the usual type of folding litter the structure includes a pair of side poles, jointed or rigid, a litter bottom of flexible material such as canvas or the like extending between the poles, and jointed means connecting the poles. The jointed means is so arranged that the poles may be held widely spaced to tension the litter bottom or may be brought close together so that the structure takes up only a small amount of storage space.

As usually constructed the jointed means, preferably termed the stretcher bar assembly, comprises a pair of rigid members or struts having ends connected by a pivot bolt and having their remaining ends pivoted to the poles, at least two of these assemblies being used for each litter. The pivotal connection between the struts is normally located midway between the poles.

Pivotal connections directly between the struts of each assembly are lacking in the necessary rigidity, when the litter is expanded for use, to enable the litter to withstand the rough usage and wear to which such litters are usually exposed. Moreover the stretcher-bar assemblies of litters usually bow downward at the joint so that when a person rests on the litter the bottom will not engage on the stretcher-bars and cause discomfort to such person. Thus, in service the ends of the struts at the poles are above the mid-joint a certain distance and this distance constitutes a moment arm for the forces due to the weight on the litter bottom. A very heavy stress, acting in a vertical plane, is thus set up in the mid-joint with consequent tendency to bend the pivot.

It is one important object of the present invention to provide a novel link connection between the proximal ends of such stretcher-bars whereby no pivots are used at exact mid-length where downward buckling force is maximum, and whereby reinforced link walls of large area and sectional strength are held to a close sliding fit and rigid engagement with a considerable length and substantial area of the ends of the strut members.

In collapsing folding litters of the kind above mentioned it is very important that the folded stretcher-bar assemblies should lie in substantial alinement with the litter poles. When a litter is collapsed the poles should not only lie close together but one must not project lengthways beyond the other: In the ordinary construction wherein the struts are directly pivoted together on a single pivot the mid-joint can swing laterally and this lateral swinging causes projection of one pole lineally beyond the other.

A second important object of the invention is to provide a novel form of mid-joint for stretcher-bar assemblies whereby the mid-joint, upon collapse of the litter, will be constrained to lie centrally of the space between the litter sides or poles and the poles will be constrained from movement longitudinally with respect to each other when the litter is fully collapsed.

In litters of this character, especially in those for war use in transporting the wounded, it is highly desirable that the structure be as light as is consistent with proper strength and rigidity.

A third important object of the invention is to provide a novel stretcher-bar assembly wherein the construction is such as to permit the use of very thin walled tubes so arranged and formed as to produce a structure of great strength and rigidity.

A fourth important object of the invention is to provide a novel method of bending thin walled tubes for this purpose whereby the tube will be bent without over stretching the material on the convex side of the bend or decreasing the wall thickness at any place or point so as to cause complete collapse due to buckling of thin walls.

With the above and other objects in view as will be presently apparent, the invention consists in general in a novel method of bending thin walled tubes and in certain novel details of construction and combination of parts hereinafter fully described, illustrated in the accompanying drawings and particularly claimed.

In the accompanying drawings like characters of reference indicate like parts in the several views, and Figure 1 is a view, partly in elevation and partly in section, showing one form of stretcher assembly as constructed in accordance with this invention.

Figure 2 is a plan view partly in section and showing parts disclosed in Figure 1.

Figure 3 is a section on the line 3—3 of Figure 1.

Figure 4 is a section on the line 4—4 of Figure 1.

Figure 5 is a fragmentary section showing a modification of the middle joint of the assembly as shown at the left of Figure 2.

Figure 6 is an enlarged detail section on the line 6—6 of Figure 1.

Figure 7 is a view similar to Figure 6 but showing a modified form of tube cross-section.

Figure 8 is a similar view but showing a second modification of the tube cross-section.

Figure 9 is a cross-section showing one form of flat end on a circular thin walled tube as used in this invention.

Figure 10 is a view similar to Figure 9 but showing a modified form of tube end.

Figure 11 is a bottom plan view of a portion of a litter showing diagrammatically the relation of the stretcher-bar assembly to the remainder of the litter.

Figure 12 is a side elevation of the parts shown in Figure 11.

Figure 13 is a fragmentary bottom plan view of a modification of the stretcher-bar assembly, the view showing the poles and legs of a litter with the poles in the position assumed when the litter is folded.

Figure 14 is a plan view, partly in section showing the struts and connecting member with the litter expanded.

Figure 15 is a cross-section through the connecting member of this form of assembly showing one form of pivot for connecting a strut and said member.

Figure 16 is a perspective view showing a bushing and washer as used in the form shown in Figure 15, the parts being disassembled.

Figure 17 is a plan view of a portion of a strut and modified connecting member.

Figure 18 is a section on the line 18—18 of Figure 17.

Figure 19 is a view similar to Figure 17 but showing a second modification of the center piece for this form of assembly.

Figure 20 is a section on the line 20—20 of Figure 19.

Figure 21 is a view similar to Figure 18 but showing a still further modification of the center piece.

Figure 22 is a reduced detail side elevation of one of the struts used herein.

Figure 23 is a longitudinal vertical section showing a slight modification of the construction shown in Figure 1.

Figure 24 is a section on the line 24—24 of Figure 23.

Figure 25 is a view similar to Figure 5 but showing a slight modification thereof.

Figure 26 is an elevation of a form of assembly wherein the connecting member E is of rectangular tubular form.

Figure 27 is a plan view partly in section of the form shown in Figure 26.

Figure 28 is a view similar to Figure 27 but showing the assembly applied to a portion of a litter and the latter folded.

Figure 29 is an enlarged fragmentary section on the line 29—29 of Figure 26.

Figure 30 is a view similar to Figure 27 but showing a packing strip or spacer used therewith.

Figure 31 is a section on the line 31—31 of Figure 30.

Figure 32 is a view of the blank from which the tubular connector of Figure 27 is made.

Figure 33 is a view of the blank from which the packing strip of Figure 30 is made.

Figure 34 is a diagrammatic view showing certain steps in the manufacture of one form of a joint member forming part of this invention.

Considering first the general relation of the present invention to the remainder of a litter to which it may be applied, there has been shown in Figures 11 and 12 a portion of a litter including a pair of handle provided poles A between which extends a webbing B of fabric or other suitable material. Legs C extend downwardly from the poles A and are arranged in pairs with the legs of each pair opposite each other when the litter is extended as in Figure 11. The poles are held apart, with the litter in use, by stretcher-bar assemblies each of which, in the present invention, includes a pair of struts D having their outer ends pivoted to the legs C and their inner or proximal ends spaced by and pivoted to a center member or elongated hinge E. It is to be noted that this arrangement of a pair of struts and elongated hinge forms a very important feature of this invention for reasons presently to be explained and the same general arrangement is carried out through all forms of this invention. Since the literal characters A to E are made merely to indicate the general parts of the structure the same characters will be used throughout to indicate, in general, corresponding parts in the various forms shown, the specific constructions of such forms being indicated by reference numerals.

In the forms of the invention shown in Figures 1 to 10 the leg C is shown as consisting of a lower portion 10 and an upper portion 11. The pole A rests in a saddle 12 which is held in spaced relation to the portion 11 by a spacer sleeve 13. A bolt 14 passes through these parts and holds them together. The specific construction of these parts is unimportant to the present invention except that the spacing of the parts 11 and 12 permits proper swinging movement of the strut D and the bolt and sleeve form a pivotal connection between the outer end of the strut and the litter pole A.

The struts, as here shown, are thin walled square tubes 15 reversely curved to arch downwardly as shown in Figure 1. The outer ends of these tubes are pivoted, as above set forth, on the sleeves 13. The member E in the form shown in Figures 1 to 4 consists of a laterally open channel member having parallel flanges 16 connected by a web 17. The proximal ends of the struts D engage between the flanges 16. In one or both ends of each tube 15 is fitted a reinforcing sleeve 18 preferably of considerably thicker wall dimension than the tube 15. Pivot pins or rivets 19 pass through the flanges 16 adjacent their free edges and these pins also pass through the proximal ends of the struts D. A sleeve 20 may surround each pin between the upper and lower sides of the tube 15 and these sides are held from contact with the flanges 16 by washers 21. Stop pins 22 extend between the flanges 16 and are so positioned as to be engaged by the struts D, as shown in Figure 2, when the struts have swung, in opening movement of the litter, slightly beyond the point at which the axes of the struts lie in a common plane. This position of the member E may be conveniently termed as "beyond the dead center" and this term will be used in what follows.

It will be noted that the tubes 15 are thin walled tubes. To bend such tubes without so distorting them that they are weakened at the bends has long been deemed impractical under ordinary shop conditions because the convex side of the tube at such a bend is stretched longitudinally and thus reduced in wall thickness unless the convex tube wall is allowed to flatten at this point. I have found that pressing the tube wall so that a longitudinal groove or inset 23 is formed therein has the effect of causing the tube to bend without stretching the opposite side which, by this operation, becomes the convex side of the bend. Moreover, the extent of displacement of the insert portion 23 is not sufficient to stretch the tube wall at this point. To accomplish this the tube does not need to be originally square but, as shown in Figure 7 a circular tube 24 may be provided with a similar inset 25. I have also found that, for certain purposes such insets may be used to increase the stiffness or resistance to bending and in Figure 8 a tube 26 is shown as provided with insets 27 on opposite sides. Such a tube will have resistance to bending out of a plane passing through the side walls centrally between the insets.

If it is preferred the struts may be made of circular tubing such as is shown at 28 in Figures 9 and 10, and the ends may either be flattened as at 29 or pressed to square cross-section as at 30.

In Figure 5 a modification of the member E is shown. In this form the flanges 31 (one only is shown) are connected by a web 32 having ends 33 offset towards the free edges of the flanges and these ends constitute stops replacing the pins 22 when the member E has moved beyond dead center. The pivot pins 19 are used in this form for connecting the struts.

In the forms of the invention shown in Figures 13 to 21 the struts D are formed of flat bar metal as shown at 35. In Figures 13 to 16 the construction at the connecting member E is accomplished in the following manner. The struts 33' have ends inclined slightly out of the plane of the body and in opposite directions, these ends lying in parallel planes. The purpose of this is to produce a downwardly arching effect. One end of each strut is pivoted on a bolt 34 to a pole A. The connecting member is similar to that shown in Figure 3, having a web 35 and parallel flanges 36. However the flanges 36 are relatively narrower than those shown in Figure 3 for purposes presently explained. The flanges 36 are provided at each side of the center with opposed openings 36' wherein is fitted a bushing 37 having on one end a flange-like head 38. Each strut 33' is provided with an opening 39 wherethrough the bushing passes. A bolt 40 passes through the bushing and between the head of this bolt and on the end of the bushing is a washer 41. By this means a very secure pivoting of the struts 33' to the connecting member is attained and the flanges 36 cannot be drawn toward each other to pinch on the struts and interfere with their pivotal action. The position of the pivots is such that, when the member E has moved beyond dead center the struts, as shown in Figure 14, will engage the end edges of the web 35, these edges thus forming stops.

In the form shown in Figures 17 and 18 the connecting member is formed by a plate 42 of elongated rectangular shape. At each end of one long side of the plate is an upstanding stop member 43 secured in position by a rivet 44. At each side of the center the plate 42 is provided with an opening 45 wherethrough passes a bolt 46 having a head 47 between which and the plate 42 is a bushing 48 which thus properly spaces the head from the plate. On the bolt is a washer 49 which rests against the under side of the plate 42 and a nut 50 serves to secure the bolt. The struts 33' have each a hole 51 which receives the bushing 48 and the stops 43 each have a head 52 which overlies the respective strut 33' when the litter is ready for use.

In the form shown in Figures 19 and 20 two rectangular plates 53 are secured in spaced relation by rivets 54 adjacent the corners of one longitudinal side. The middle parts of the opposite longitudinal edges are secured by a yoke 55 and rivet 56. Pivot pins 57 extend through the plates and through the struts 33'. In this form the rivets 54 form the stops for limiting the pivotal movements of the struts when the part E has moved beyond dead center, and the yoke 55 forms stops to prevent swinging in closed position.

The connecting member E of Figure 21 is similar to that shown in Figure 15 but the web 58 has one wide flange 59 and one narrow flange 60, the strut 33' being pivoted to the wide flange by the same pivot arrangement as in Figure 18. Similar to Figure 14, the ends of the web 58 constitute stops for the struts.

The form shown in Figures 23 and 24 is a slight modification of that shown in Figure 1. In this form the holes in the struts 15 for the pivots 19 are spaced considerably further from the proximal ends of these struts so that the struts have short arms 61. Connecting the flanges 16 are stop pins 62 which are engaged by the arms 61 when the litter is folded. This arrangement hinders one pole A from shifting longitudinally of the other pole as the connecting member E must change its angular relation to the struts D before the poles can thus shift and the engagement of the arms 61 and stops prevents this angular change.

In Figure 25, which is a slight modification of Figure 5, the provision of the short arms 61 on the strut enables the inclined portions 63 of the web 32 to act as stops as in the last mentioned form.

In any of the tubular constructions the ends may be closed by plugs 64.

In the form of the invention shown in Figures 26 to 33 the connecting members E is made from a blank of sheet material having a rectangular central or body portion bent along fold lines 65 to provide a web or rear side 66 and a pair of flanges or top and bottom sides 67. The blank is provided at the edges opposite the web part with lips 68 which, when the blank is folded with the lips bent toward each other on the fold lines 69 contact at their free edges and form the front side of the member E. These lips are so proportioned that, when the edges contact, the flange portion 67 will be parallel, and the free edges of the lips afford stops for struts when in closed position. These stop-edges are notched to afford clearance for the tabs of the spacer shim as shown in Figure 26. This clearance permits the use of shims of different thickness without affecting the stopped position of the struts. The contacting edges of lips 68 may be welded or cemented so as to afford the stiffness of a solid rectangular tube in resisting the vertical bending force. Moreover the blank has tabs 70 at the ends of the part 66, these tabs being bent forwardly to form stops as best seen in Figures 27 and 30. The free corners of the flanges 67 are connected by pins or rivets 71 on which are pivoted the usual struts 72 having short arms 73 of such length that the ends of these arms engage the stops 70 when the litter is folded. These tabs may be omitted if desired, the lips being depended upon for stops.

Referring especially to Figures 27, 30 and 33 it will be noted that when the member E has moved beyond dead center the remote ends of the struts will lie slightly closer than when the struts D are in alinement. Consequently there will be some relaxation on the litter bottom B. Due to imperfect adjustment or wear of the parts the member E may move too far beyond dead center and the looseness of the bottom B be excessive. In order to prevent or overcome this undesirable condition, the piece shown in Figure 30 may be used. This consists of a spacer or shim 74 which may be fitted against the inner faces of the lips and there held by tabs 75 bent around these lips as shown in Figure 30.

It will be seen that the lips in Figure 27 and this shim 74 in Figure 30 constitute stop means for the strut ends 73 to prevent the member E from having too great movement past the dead center.

As shown in Figure 31 a spacing sleeve 76 may be employed in this form as well as in other forms of the device.

It will be seen that Figure 29 shows an illustration of the simplest form of construction, in which the struts D may be made of any suitable material, tubular or solid, without spacer sleeves and relying on the abutting end lips 68 to hold the engaging faces between struts D and walls 67 to a close sliding fit against the tension of the pivot pin or bolt.

Figure 34 illustrates a modification of the blank shown in Figure 32 with the tabs 70 omitted. Here the blank 76 may be cut from a strip 77 of metal of appropriate width by punching transversely of the strip as at 78 thus forming the notched lips 79. Preferably, the punching machine is arranged to bend the lips as shown at 80. This forms a method of cutting the blanks which is very economical when it is desired to use narrow strip metal for the purpose since little waste or scrap is made. However, I may cut the blanks from wider sheets with the tabs 70 in use. This I accomplish by staggering rows of blanks so that the tabs 70 of one row are formed from the material of the next row.

It is to be understood that the members D must fit closely against the member E so that the latter reinforces the former and the former reinforces the latter and thus stiffness is added to the center of the stretcher-bar assembly to resist bending due to the remote ends of members D being higher than their proximal ends.

Having thus described the invention, what is claimed is:

1. A mid-joint for litter stretcher-bar assemblies including a pair of proximal and spaced stretcher-bar ends, a channel like member including a web and a pair of flanges, said ends fitting closely between said flanges, pivot pins passing through said flanges and ends, and lips on the free edges of the flanges against which the said ends tend to engage upon expansion of the litter.

2. A mid-joint for litter stretcher-bar assemblies including a pair of proximal and spaced stretcher-bar ends, a channel like member including a web and a pair of flanges, said ends fitting closely between said flanges, pivot pins passing through said flanges and ends, lips on the free edges of the flanges against which the said ends tend to engage upon expansion of the litter, and a shim interposed between said lips and said ends.

3. In a litter, including a pair of side poles, a spreader-bar connecting said poles and comprising a mid-length link having oppositely disposed sides, a pair of struts of tubular cross-section connected at spaced points by pivot pins extending between said sides, said strut ends each having a close sliding fit with said sides for the full length of said end lying within the length of said link and re-inforcing tubes fitted within each said link engaged strut end.

SAMUEL G. THOMSON.

REFERENCES CITED

The following references are of record in the file of this patent:

UNITED STATES PATENTS

| Number | Name | Date |
| --- | --- | --- |
| 1,305,388 | Luria | June 3, 1919 |
| 1,389,682 | Melniker | Sept. 6, 1921 |
| 1,520,134 | Mizer | Dec. 23, 1924 |
| 1,985,694 | Rosenbaum | Dec. 25, 1934 |
| 2,133,692 | Gittings et al. | Oct. 18, 1938 |

FOREIGN PATENTS

| Number | Country | Date |
| --- | --- | --- |
| 184,338 | Great Britain | Aug. 17, 1922 |
| 340,173 | Italy | May 4, 1936 |